US010712735B2

(12) United States Patent
Ibrahim et al.

(10) Patent No.: US 10,712,735 B2
(45) Date of Patent: Jul. 14, 2020

(54) METHODS AND SYSTEMS FOR INFRASTRUCTURE-MONITORING CONTROL

(71) Applicant: ASCO Power Technologies, L.P., Florham Park, NJ (US)

(72) Inventors: Mario Ibrahim, Summit, NJ (US); Dan Sylvester, Mountain Lakes, NJ (US)

(73) Assignee: ASCO POWER TECHNOLOGIES, L.P., Florham Park, NJ (US)

( * ) Notice: Subject to any disclaimer, the term of this patent is extended or adjusted under 35 U.S.C. 154(b) by 875 days.

(21) Appl. No.: 14/206,505

(22) Filed: Mar. 12, 2014

(65) Prior Publication Data
US 2014/0303751 A1    Oct. 9, 2014

Related U.S. Application Data

(60) Provisional application No. 61/776,805, filed on Mar. 12, 2013.

(51) Int. Cl.
*G05B 23/02*    (2006.01)
*G05B 15/02*    (2006.01)

(52) U.S. Cl.
CPC ......... *G05B 23/0272* (2013.01); *G05B 15/02* (2013.01); *G05B 23/0216* (2013.01);
(Continued)

(58) Field of Classification Search
None
See application file for complete search history.

(56) References Cited

U.S. PATENT DOCUMENTS

| 4,815,014 A | * | 3/1989 | Lipner | G06F 3/033 376/216 |
| 5,375,150 A | * | 12/1994 | Scarola | G05B 9/03 370/351 |

(Continued)

FOREIGN PATENT DOCUMENTS

| CN | 101588067 A | 11/2009 |
| CN | 102035260 A | 4/2011 |

(Continued)

OTHER PUBLICATIONS

The State Intellectual Property Office of the People's Republic of China Search Report for Application No. 201410090905.2.

(Continued)

*Primary Examiner* — Sean Shechtman
(74) *Attorney, Agent, or Firm* — Lock Lord LLP

(57) ABSTRACT

Methods and systems for infrastructure-monitoring control are provided. An example method for providing a visual representation of system events occurring in a system monitored by an infrastructure-monitoring control system includes the infrastructure-monitoring control system providing, in substantially real-time, a visual representation of at least one system event occurring in the system, wherein the visual representation comprises a color-coded visual representation depicting the at least one system event throughout the system. The method further includes the infrastructure-monitoring control system storing the visual representation. Still further, the method includes the infrastructure-monitoring control system then providing the visual representation after a given amount of time since the at least one system event.

20 Claims, 12 Drawing Sheets

(52) U.S. Cl.
CPC .............. *G05B 2219/24055* (2013.01); *G05B 2219/2642* (2013.01); *Y04S 10/527* (2013.01)

(56) References Cited

U.S. PATENT DOCUMENTS

| | | | | |
|---|---|---|---|---|
| 5,914,875 | A * | 6/1999 | Monta | G05B 23/0272 376/245 |
| 7,859,571 | B1 * | 12/2010 | Brown | G08B 13/19645 348/211.3 |
| 8,060,259 | B2 * | 11/2011 | Budhraja | H02J 3/008 700/291 |
| 9,298,182 | B2 * | 3/2016 | Joo | G05B 23/0272 |
| 2001/0006384 | A1 * | 7/2001 | Usaki | G01C 21/00 345/204 |
| 2003/0139837 | A1 * | 7/2003 | Marr | G05B 23/0278 700/110 |
| 2009/0237247 | A1 * | 9/2009 | Brunetti | G08B 13/196 340/541 |
| 2013/0268196 | A1 * | 10/2013 | Dam | G01W 1/00 702/3 |

FOREIGN PATENT DOCUMENTS

| | | |
|---|---|---|
| CN | 102882277 A | 1/2013 |
| EP | 0280553 A2 | 8/1988 |

OTHER PUBLICATIONS

The State Intellectual Property Office of the People's Republic of China First Office Action for Application No. 201410090905.2 with Translation dated Aug. 28, 2017.
The State Intellectual Property Office of the People's Republic of China Second Office Action for Application No. 201410090905.2 with Translation dated May 14, 2018.
The State Intellectual Property Office of the People's Republic of China Third Office Action for Application No. 201410090905.2 with Translation dated Nov. 30, 2018.
"Power Network Automation", Shanxi Electric Power Corporation Edition, pp. 74-80, China Electric Power Press, May 2009, May 31, 2009 (without translation).
Power Network Automation; Shanxi Electric Power Corporation Edition, pp. 74-80, China Electric Power Press, May 2009.
4th Office Action for Chinese Application No. 201410090905.2 dated Jun. 25, 2019 (without translation).

* cited by examiner

METHODS AND SYSTEMS FOR INFRASTRUCTURE-MONITORING CONTROL

BACKGROUND

Unless otherwise indicated herein, the materials described in this section are not prior art to the claims in this application and are not admitted to be prior art by inclusion in this section.

Various infrastructure real-time monitoring systems exist on the market today. These infrastructure monitoring systems provide real-time visual status of equipment in an infrastructure system. For instance, amongst other equipment, infrastructure monitoring systems may provide real-time visual status of analog values and alarms of power, HVAC (heating, ventilation, and air conditioning), data center, uninterruptable power, security, and fire equipment of a facility. In addition, these infrastructure-monitoring systems may store event logs for system events. For instance, in an example, a system-wide event log may be stored in list and data graph format. This system-wide event log may include time-stamped analog trends and critical alarms that occurred throughout the system. Further, this system-wide event log in list and data graph format may be used for future analysis of equipment faults, failures or sequence of events.

SUMMARY

In one example aspect, a method for providing a visual representation of system events occurring in a system monitored by an infrastructure-monitoring control system is provided. The method includes the infrastructure-monitoring control system providing, in substantially real-time, a visual representation of at least one system event occurring in the system, wherein the visual representation comprises a color-coded visual representation depicting the at least one system event. Further, the method includes the infrastructure-monitoring control system storing the visual representation. Still further, the method includes the infrastructure-monitoring control system providing the visual representation after a given amount of time since the at least one system event.

In another aspect, another method for providing a visual representation of system events occurring in a system monitored by an infrastructure-monitoring control system is provided. The method includes the infrastructure-monitoring control system providing, in substantially real-time, a visual representation of at least one system event occurring in the system, wherein the visual representation depicts the at least one system event. Further, the method includes the infrastructure-monitoring control system storing the visual representation. Still further, the method includes the infrastructure-monitoring control system providing the visual representation after a given amount of time since the at least one system event.

In still another example, an infrastructure-monitoring control system is provided. The infrastructure-monitoring control system includes a communication interface, a memory configured to store program instructions, and a processor. The processor is capable of executing the program instructions to: (i) provide, in substantially real-time, a visual representation of at least one system event occurring in the system, wherein the visual representation depicts the at least one system event; (ii) store the visual representation; and (iii) provide the visual representation after a given amount of time since the at least one system event.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 4A-1, 4A-2, and 4A-3 depict an example screen shot of visual representations of the infrastructure-monitoring control system, according to an example embodiment of the present disclosure.

FIGS. 4B-1, 4B-2, and 4B-3 depict an example screen shot of visual representations of the infrastructure-monitoring control system, according to an example embodiment of the present disclosure.

FIGS. 4C-1, 4C-2, and 4C-3 depict an example screen shot of visual representations of the infrastructure-monitoring control system, according to an example embodiment of the present disclosure.

DETAILED DESCRIPTION

Figure 1:
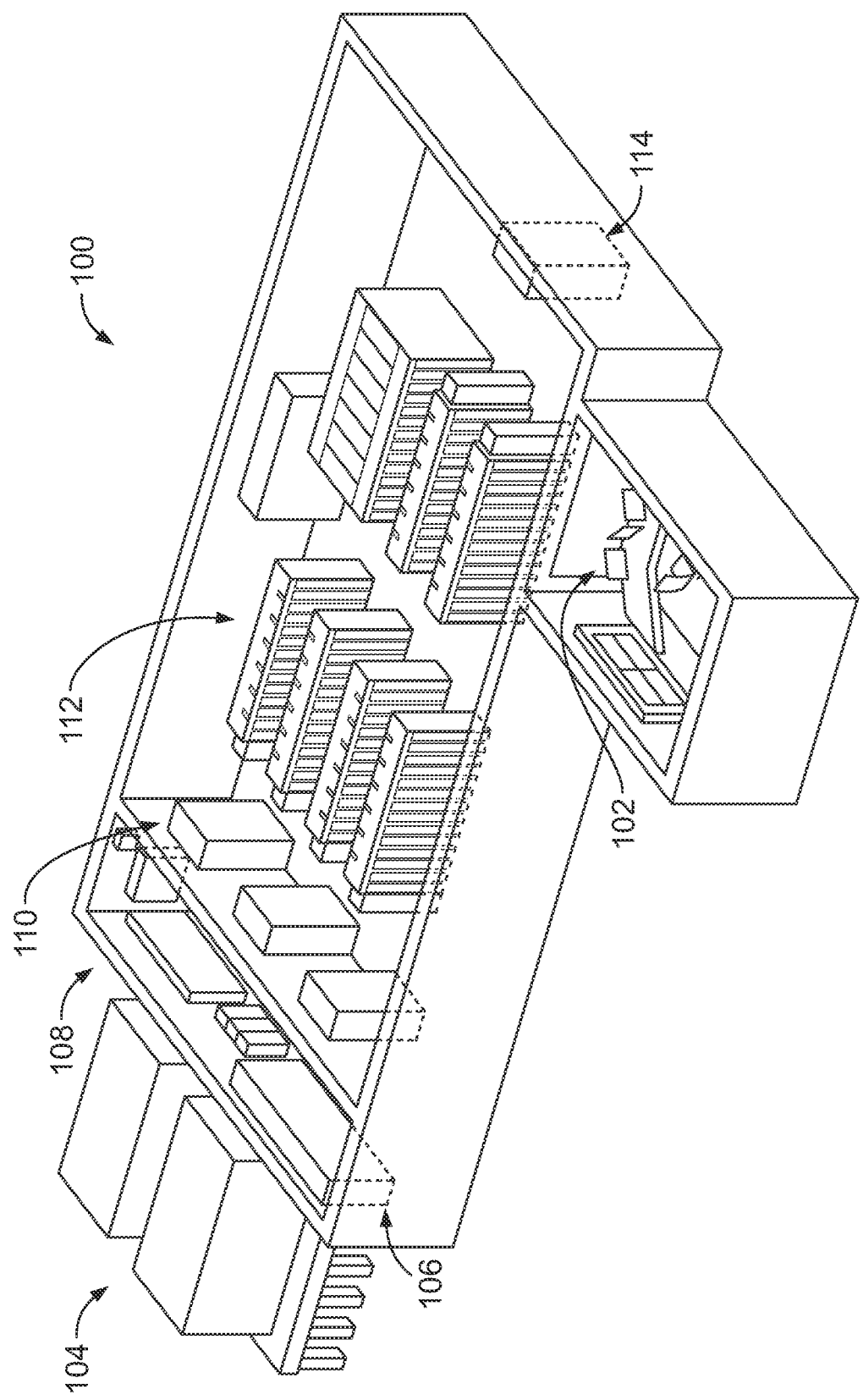
FIG. 1 is an illustration of an example infrastructure system, according to an example embodiment of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Overview

Infrastructure-monitoring systems may be a beneficial tool for building and facility managers to monitor equipment activity in their facility. For instance, infrastructure-monitoring systems may monitor equipment infrastructure equipment (e.g., power, energy, cooling, data center, security, HVAC, and fire equipment), and this may help building and facility managers keep a pulse on what is happening in their facility.

Various infrastructure real-time monitoring systems exist on the market today. Amongst other equipment, the infrastructure-monitoring systems provide real-time visual status of power, HVAC, data center, uninterruptable power, security, and fire equipment of a facility. These infrastructure-monitoring systems may display visual representations in substantially real-time as system events occur. In addition, in infrastructure-monitoring systems, system-wide event logs, analog trending and critical alarms may be time stamped and stored in text-based event logs (e.g., list and data graph format) for future analysis of the equipment and system events. A building or facility manager may review these stored text-based logs to review equipment faults, equipment failures and/or sequence of system events.

Although this text-based stored information may be useful for analysis of system events, this text-based list format lacks the comprehensive visual benefit provided by the monitoring system in real-time. In existing infrastructure-monitoring control systems, the visual representation of the system event or events is only useful during an event if a user (e.g., building or facility manager) happens to be watching the visual representation in real-time. However, once the visual representation of an event or sequence of events is complete, the visual/graphical representation of what happened is lost, and the system event(s) can then only be analyzed through the text-based event logs with time stamps.

In accordance with the present disclosure, an infrastructure-monitoring control system may store representations of system events occurring in the infrastructure system for later viewing, reproduction and/or system analysis. In one arrangement, all of the system events may be stored. Alternatively, only certain designated system events may be stored. Beneficially, this disclosed storage may allow a user of the infrastructure-monitoring control system to view, after the system event(s), the visual representation of recorded events, analog values and alarms as if they were watching the event(s) unfolding in real-time at the infrastructure-monitoring control system. Thus, the methods and systems described herein can facilitate dynamic visual representation playback of system events monitored by the infrastructure-monitoring control system.

An example method in accordance with the present disclosure may involve the infrastructure-monitoring control system providing, in substantially real-time, a visual representation of at least one system event occurring in the system, wherein the visual representation comprises a descriptive indicator (e.g., color-coded, shaded, highlighted, etc.) visual representation depicting the at least one system event, and preferably a plurality of interrelated system events. Further, the example method may involve the infrastructure-monitoring control system storing the visual representation. Still further, the method may involve the infrastructure-monitoring control system then providing the visual representation after a given amount of time since the at least one system event. The given amount of time may be any amount of time after the system event, such as minutes, hours, days, or months after the system event. As just one example, the method may involve the storage of a control system operation experiencing a fault and what system events occurred either immediately prior to the fault and/or immediately after the fault. With such a disclosed system, the method would allow a visual representation to be recalled from a data storage and replayed one or more times to understand what fault occurred, why the fault occurred, and how the system responded to this fault condition. As those of skill in the art will recognize, various other control system events can be stored, and then replayed and reviewed.

The disclosed infrastructure-monitoring control system addresses the aforementioned problems of existing infrastructure-monitoring control systems by allowing a user to view the visual representations both in real-time and after the system event or events have occurred. Beneficially, storing these visual representations of system events may facilitate dynamic event playback of network events and network incidents. Being able to store and then allow for dynamic event playback may enable a user (i.e., system owner, system operator, maintenance staff or service technician/engineer) to view a visual representation of a particular event or sequence of events after the event(s) occurred. Thus, a user may graphically see and visually analyze this particular event or sequence of events, rather than merely analyzing the event after the fact through certain known forms of text-based event logs and other static type of information.

In an example, the playback system may display an exact or substantially similar copy of what the control system would have shown in real-time during a particular operating system time span, such as during a fault condition. In another example, the playback system may display an exact or substantially similar copy of the operation of a specific portion of the control system (e.g., a network of back up servers) or a specific component (e.g., only one of the servers in the network) of the control system would have shown in real-time during a particular operating system time span, such as during a fault condition or immediately prior to a fault condition. Such a system allows for the efficient configuration, monitoring, and diagnosing of network events and network components. With such a system, all or only certain selected network components can be graphically managed and maintained either locally or remotely.

2. Example Infrastructure-Monitoring Control System

FIG. 1 is an illustration of an example infrastructure system in which the proposed methods and systems can be implemented. It should be understood, however, that numerous variations from the arrangement and functions shown are possible while remaining within the scope and spirit of the claims. For instance, elements may be added, removed, combined, distributed, substituted, re-positioned, re-ordered, or otherwise changed. Further, where this description refers to functions being carried out by an entity such as an infrastructure-monitoring control system, it will be understood that the entity can carry out the functions by itself or with the assistance of other entities, and through application of hardware, firmware and/or software logic. For instance, the entity may include a processor programmed with instructions to implement the functions described. Still further, it should be understood that all of the discussion above is considered part of this detailed disclosure.

The system 100 includes an infrastructure-monitoring control system 102 and infrastructure equipment 104-114 monitored by the infrastructure-monitoring control system 102. In general, the infrastructure-monitoring control system 102 may monitor any equipment associated with building operation. For instance, in this example, infrastructure-monitoring control system 102 monitors generators 104, programmable logic controllers (PLCs) 106, transfer switches 108, fire-pump controllers 110, uninterruptible power supplies (UPSs) 112, and battery-monitoring equipment 114. Infrastructure-monitoring control system 102 may monitor other equipment as well, including without limitation protective relays, surge-protection equipment, networking equipment, HVAV equipment, fuel systems, flywheels, servers and virtual machines, CRAC units, power distribution units, paralleling gear, GPS receivers, load banks, power quality meters, breakers, sequence recorders, security equipment, fire alarms, branch circuits, station batteries, DC equipment, and/or other equipment. In this illustrated arrangement, the infrastructure-monitoring control system 102 is located on site of the monitored equipment. However, alternatively, the infrastructure-monitoring control system 102 may be located remotely such as at a remotely located control center.

Figure 2:
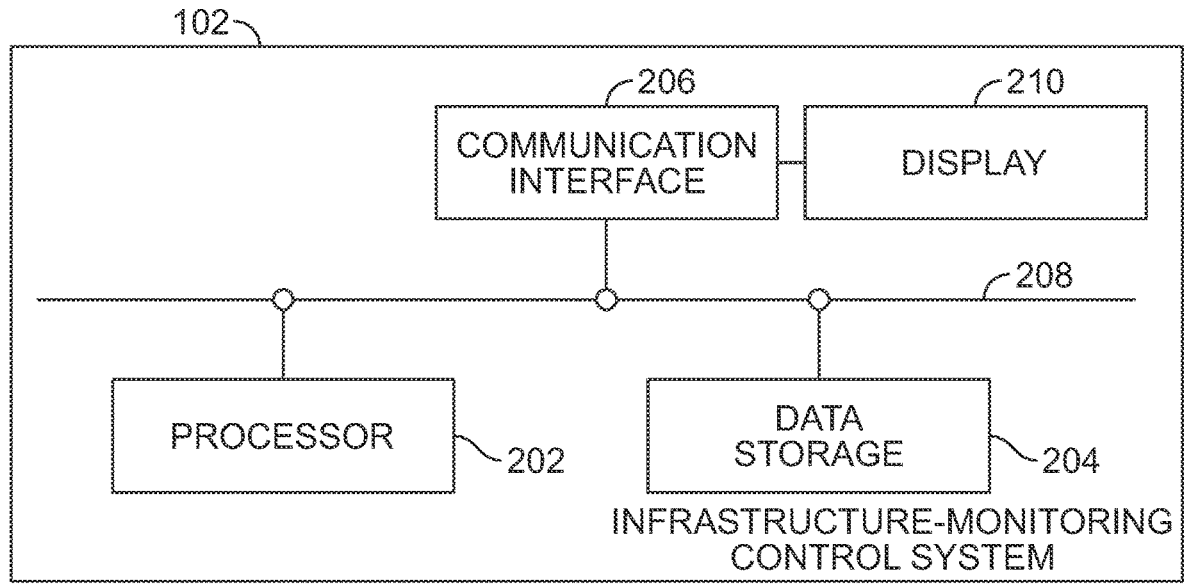
FIG. 2 is an illustration of an example infrastructure-monitoring control system, according to an example embodiment of the present disclosure.

The infrastructure-monitoring control system 102 may be configured to carry out various functions of the disclosed methods. FIG. 2 is a simplified block diagram of the infrastructure-monitoring control system 102 showing some of the components that such an infrastructure-monitoring control system 102 may include to facilitate implementation of the present methods. As shown in FIG. 2, the infrastructure-monitoring control system 102 may include a processor 202, data storage 204, and communication interface 206, all of which may be coupled together by a system bus or other mechanism 208.

Each of these components of the infrastructure-monitoring control system 102 may take various forms. For instance, processor 202 could be one or more general-purpose microprocessors and/or dedicated signal processors. Data storage 204 could be volatile and/or nonvolatile memory, such as flash memory. The infrastructure-monitoring control system 102 may communicate with entities of the infrastructure system 100, such as equipment 104-114. Data storage 204 holds a set of logic (e.g., computer instructions) executable by processor 202 to carry out the various infrastructure-monitoring control system functions described herein and perhaps other functions. Data storage 204 may also have stored therein visual representations of system events and/or data corresponding to visual representations of system events. In some embodiments, one or more of the infrastructure-monitoring control system 102 functions can be carried out by firmware and/or hardware. Further, communication interface 208 may include or be connected to a display 210 (e.g., computer monitor). In an example, the infrastructure-monitoring control system 102 may display visual representations of system events on display 210. In one preferred arrangement, the display may comprise a soft touch operator display that provides for the display of various interactive icons allowing a user to replay certain stored operating system events thereby allowing interactive playback previous system events.

3. Example Methods for an Infrastructure-Monitoring Control System

Figure 3:
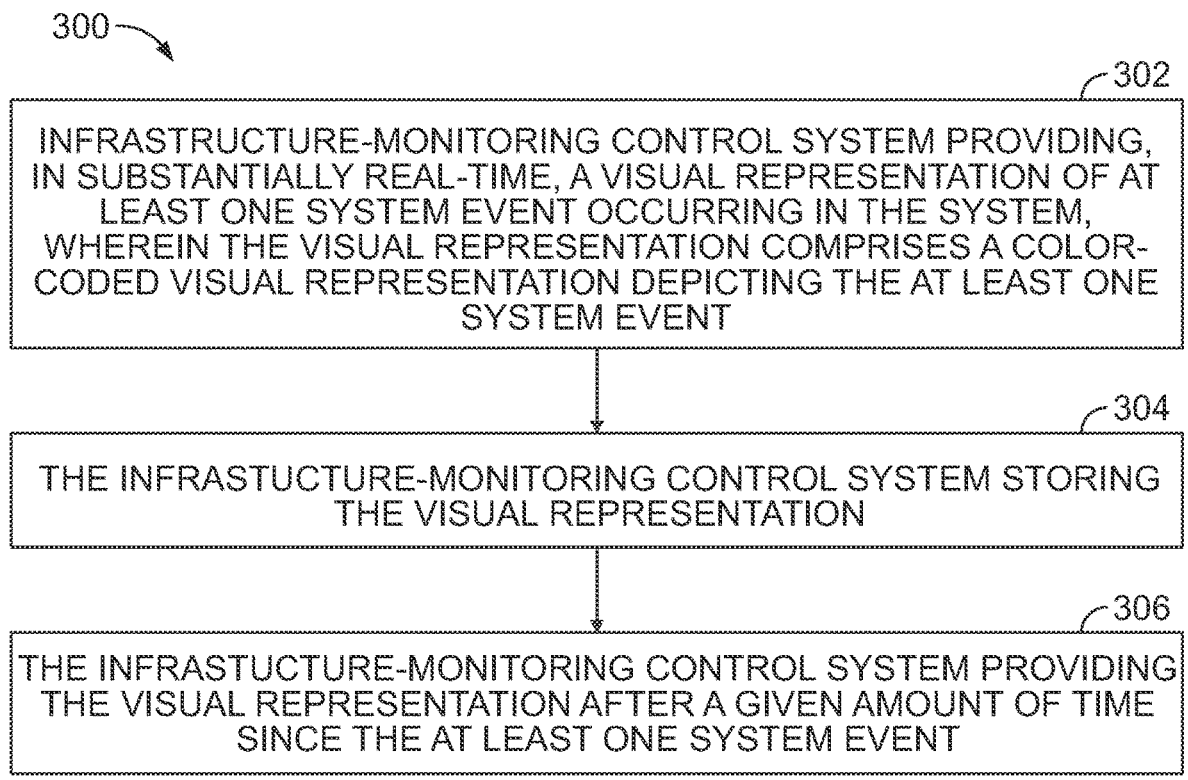
FIG. 3 is a flow chart illustrating an example method, according to an example embodiment of the present disclosure.

FIG. 3 is a flow chart depicting functions that can be carried out in the disclosed process in practice, in accordance with an example embodiment. The method 300 of FIG. 3 provides for providing a visual representation of stored system events occurring in a system monitored by an infrastructure-monitoring control system both in substantially real-time during the system events and after a given amount of time since the occurrence of the system events.

As shown in FIG. 3, at block 302, the method involves an infrastructure-monitoring control system providing, in substantially real-time, a visual representation of at least one system event occurring in the system. In one preferred arrangement, the visual representation comprises a visual representation depicting the at least one system event throughout the system wherein certain descriptive indicators are used in the visual representation. As just one example, in a preferred arrangement, the visual representation comprises a color-coded visual representation depicting the at least one system event throughout the system.

At block 304, the method then involves the infrastructure-monitoring control system storing the visual representation. At block 306, the method involves the infrastructure-monitoring control system providing the visual representation after a given amount of time since the at least one system event has been stored. Method 300 shown in FIG. 3 presents an embodiment of a method that could be carried out by infrastructure-monitoring control system 102 of FIG. 2, or components of the infrastructure-monitoring control system 102, for example.

It should be understood that for this and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, or compact-disc read only memory (CD-ROM), for example. The computer readable media may also be any other volatile or non-volatile storage systems, or other articles of manufacture. The computer readable medium may be considered a computer readable storage medium, for example, or a tangible storage device.

In addition, for the method 300 and other processes and methods disclosed herein, each block may represent circuitry that is wired to perform the specific logical functions in the process. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Returning to FIG. 3, at block 302, the infrastructure-monitoring control system 102 may provide, in substantially real-time, a visual representation of at least one system event occurring in the system 100. In an example embodiment, the visual representation comprises a color-coded visual representation depicting the at least one system event throughout the system 100.

For example, in one situation, the system 102 would allow a user to visualize a fault via color where a protective relay signals that there is an undesired bus differential within the system. Such a differential may turn the effected area of the system from one particular color (e.g., green) to a particular warning color (e.g., red). This would allow the user of the system to take notice of this undesired but differential and then visual how the system is impacted by such a fault. In another example, the system may be used detect not just fault conditions but also other operating conditions. As just one example, the system may be used to detect a poor power quality within the system. The system may react to such a situation by designating the impacted area of the system turn a different color (e.g., yellow) based on how good or how bad the power quality is on that particular line. This would allow the user to estimate how risky is the power path is for certain equipment on that line and therefore would also allow the user to estimate any negative impact on the equipment over a certain period of time.

The at least one system event may generally be any system event or any component event that may be useful for a user monitoring the system 100 to be aware of. These system events may span, for example, from normal operation of system equipment to equipment failure. In an example, the at least one system event may be a power-quality problem occurring in the infrastructure system 100. Generally, a power-quality problem may be a power problem manifested in voltage, current, or frequency deviations that may result in reduction in expected life, disoperation, and/or failure of system equipment. As mentioned above, the infrastructure-monitoring control system 102 may monitor equipment in the infrastructure system 100, such as building equipment 104-114. It may be useful for a user of the infrastructure-monitoring system 102 to be aware of system events that result in reduction in expected life, disoperation, or failure of system equipment 104-114.

The visual representation of the at least one system event may visually depict the at least one system event occurring in the system. In an example, a system event or events may propagate through the infrastructure system 100. For instance, a first system event may lead to a second system event, which may in turn lead to a third system event, and so forth. For example, a fire in a building may lead to an equipment failure or an alarm, which may in turn lead to further equipment failures and/or alarms. Beneficially, these visual representations may demonstrate propagation of the at least one system event through the entire system 100. These visual representations may be valuable both in real-time and for future analysis. A user of the infrastructure-monitoring system 102 may view these events in real-time, and having access to these visual representations may help the user respond to system events in order to control or fix the system events. For instance, a user of the infrastructure-monitoring control system 102 viewing the visual representation may determine that given equipment is in a critical state or setting off system alarms, and based on the visual representation the user may determine which steps to take are most appropriate for the given system event. Knowing and graphically seeing in real-time which equipment is affected by the at least one system event may be extremely useful for a user to take appropriate corrective action whether by equipment upgrade, replacement, maintenance, or otherwise.

In an example, the infrastructure-monitoring control system 102 provides the visual representation on a monitor, such as display 210, of the infrastructure-monitoring control system 102. Therefore, a user of the infrastructure-monitoring control system 102 may watch these events in substantially real-time on display 210.

In an example embodiment, infrastructure-monitoring control system 102 can provide descriptive indicator for certain system events. As just one example of such indicators, the infrastructure-monitoring control system 102 can rate system events on a scale having a plurality of levels (e.g., criticality levels). For instance, in an example embodiment, the infrastructure-monitoring control system 102 may rate events on a scale of 1-3, where "level 1" corresponds to normal operation, "level 2" corresponds to abnormal operation, and "level 3" corresponds to emergency operation or equipment failure. Additional or fewer levels on the scale are possible as well (e.g., the system 102 may rate events on a scale of 1-10, wherein the events range from normal operation to failure).

Further, in this example embodiment, the infrastructure-monitoring control system 102 may associate each event level with a color oriented descriptive indicator. In order to provide a visual representation of the system events occurring throughout infrastructure system 100, the infrastructure-monitoring control system 102 may determine, for each of the at least one system event, a level of the system event. Further, providing the visual representation of these system events may then involve, for each of the system events, depicting the system event with a given color associated with the determined level of the system event. Having a plurality of color-coded event levels may beneficially visually assist a user of the infrastructure-monitoring equipment 102 determine the criticality of events occurring throughout the infrastructure system 100.

Continuing the example above, "level 1" events corresponding to normal operation may be associated with the color green; "level 2" events associated with abnormal operation may be associated with the color yellow; and "level 3" events associated with emergency operation may be associated with the color red. Therefore, in a given visual representation, equipment operating normally may appear green, equipment operating abnormally may appear yellow, and equipment operating in emergency mode or failed equipment may appear red. Other descriptive indicators/colors and color associations are possible as well.

These color-coded visual representations may provide a visual representation that indicated the severity and criticality of system events as they occur in real-time. For instance, when a system event occurs, the color-coded visual representation may depict various equipment operation going from green to yellow to red in real-time. The user of the control system 102 may see this color-coded representation in real-time, and the user may use this information to appropriately respond to the system events.

Figures 1, 4A:
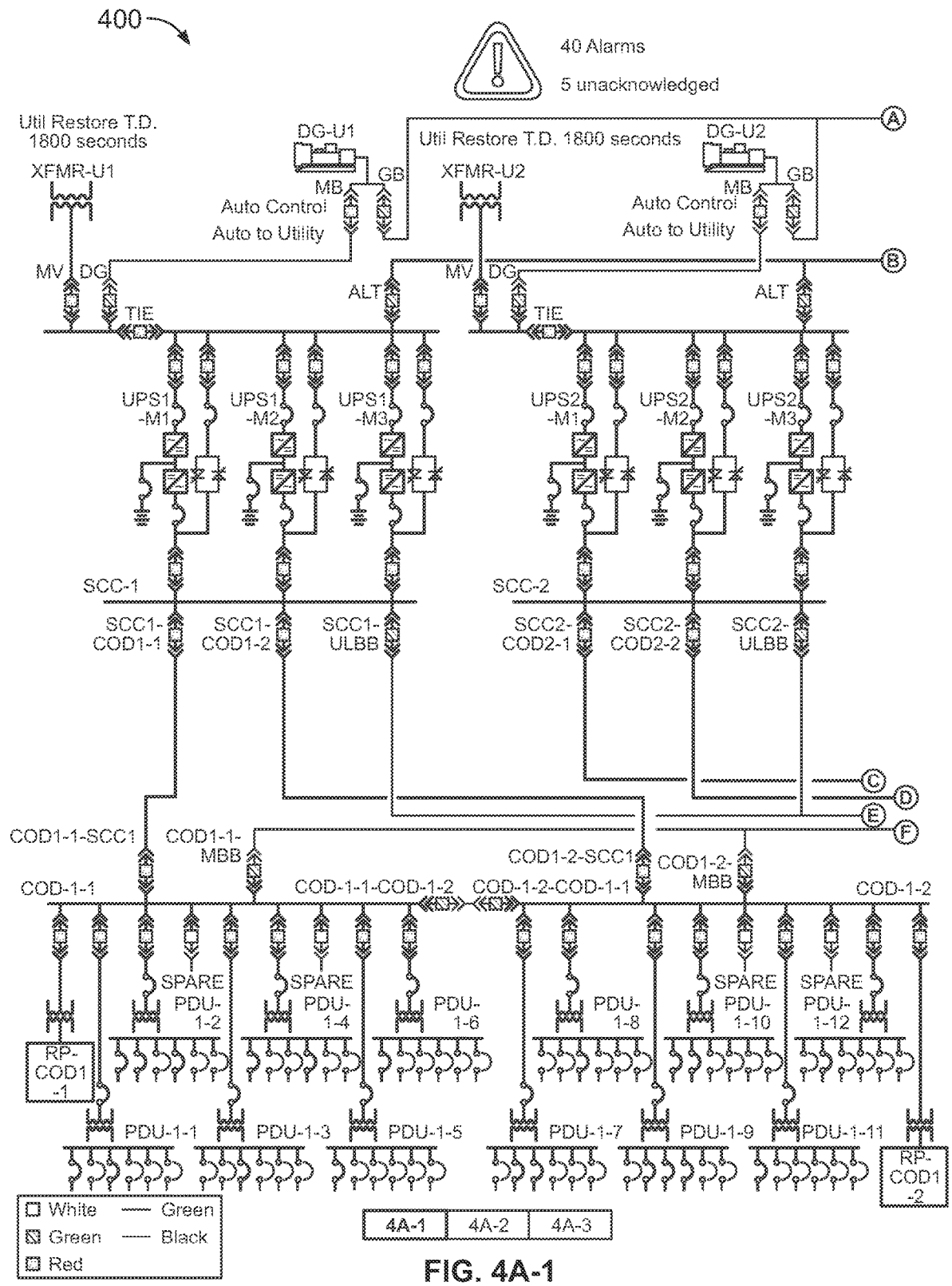
Figures 2, 4A:
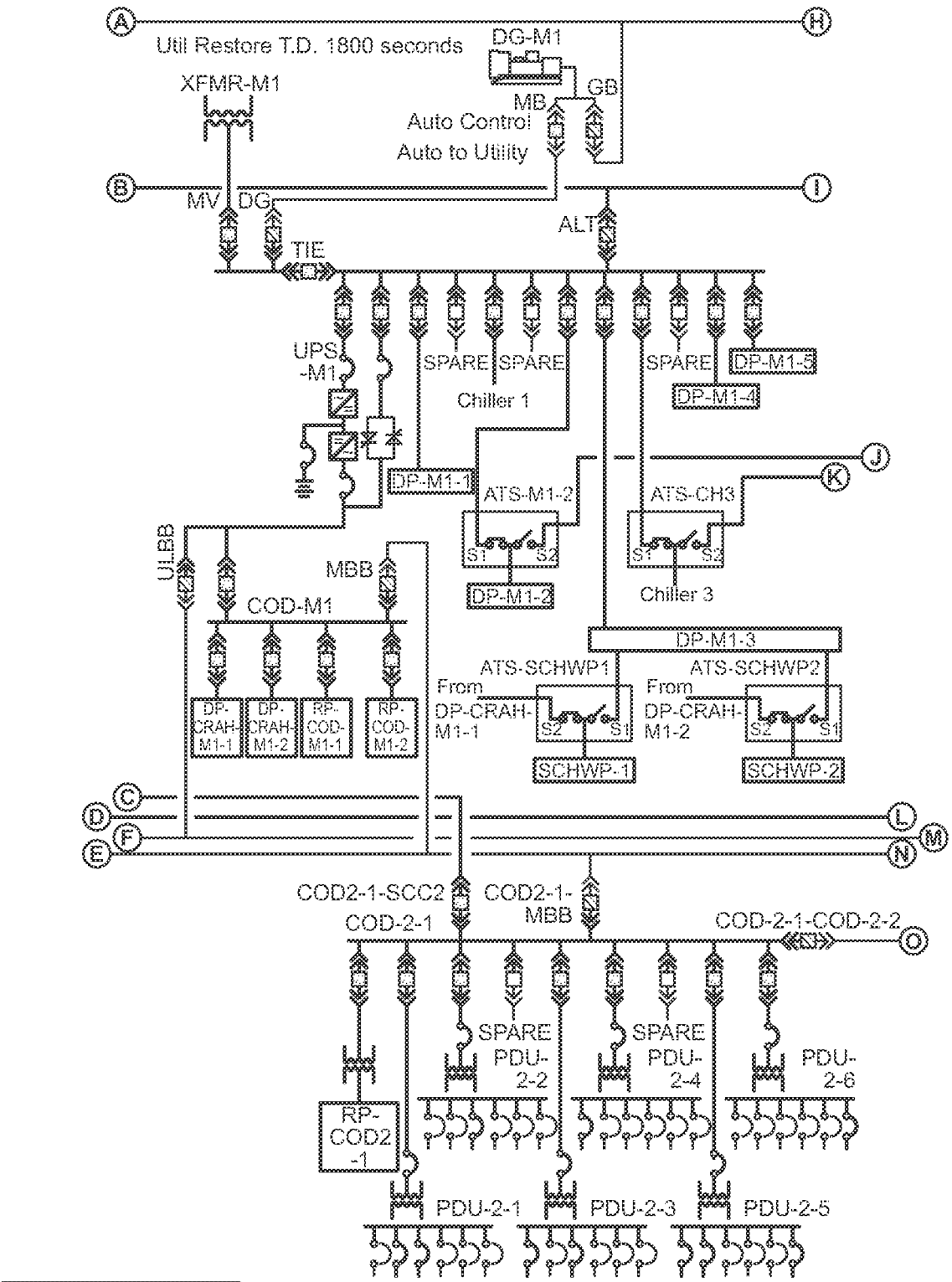
Figures 3, 4A:
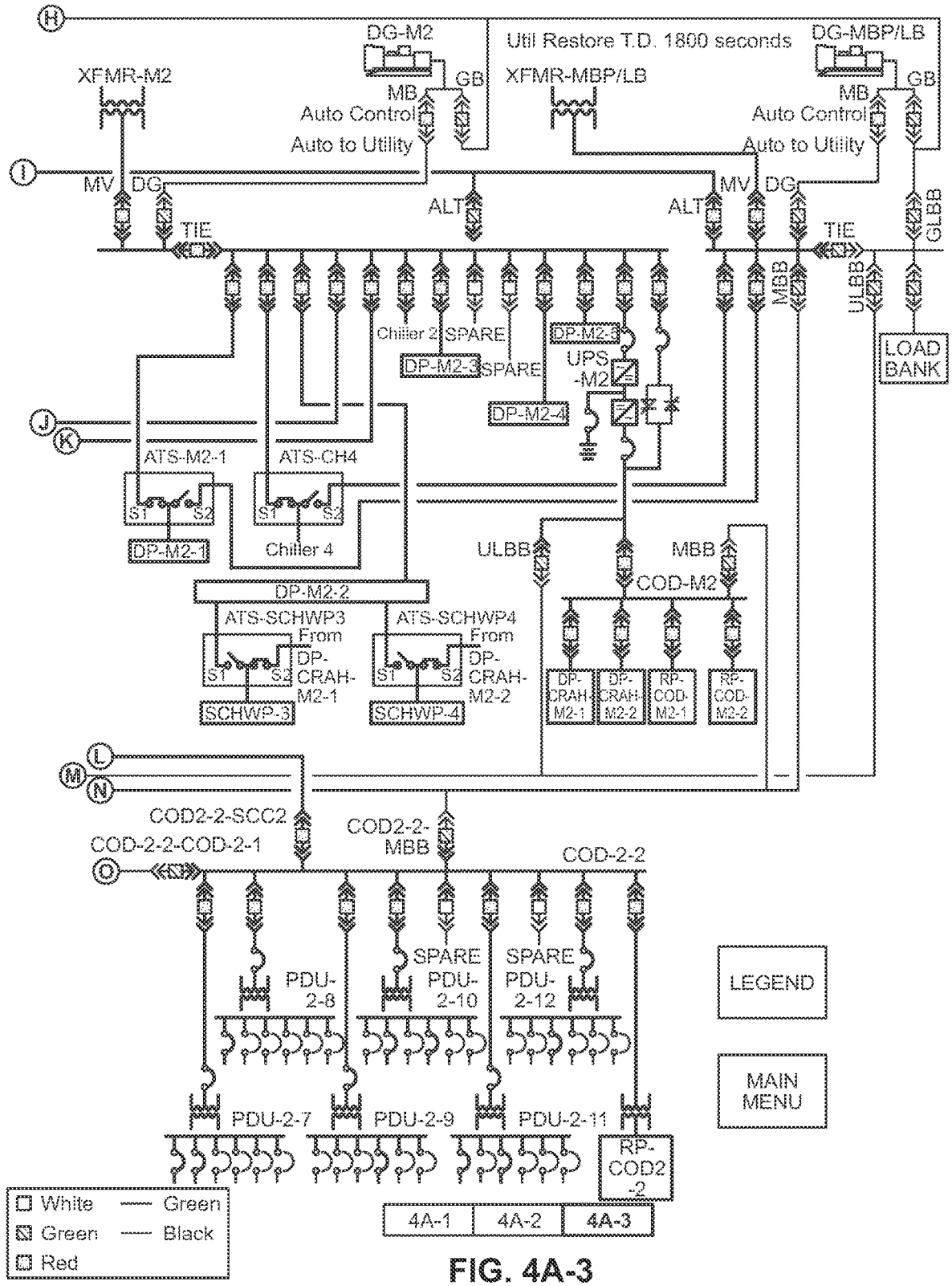
Figures 1, 4B:
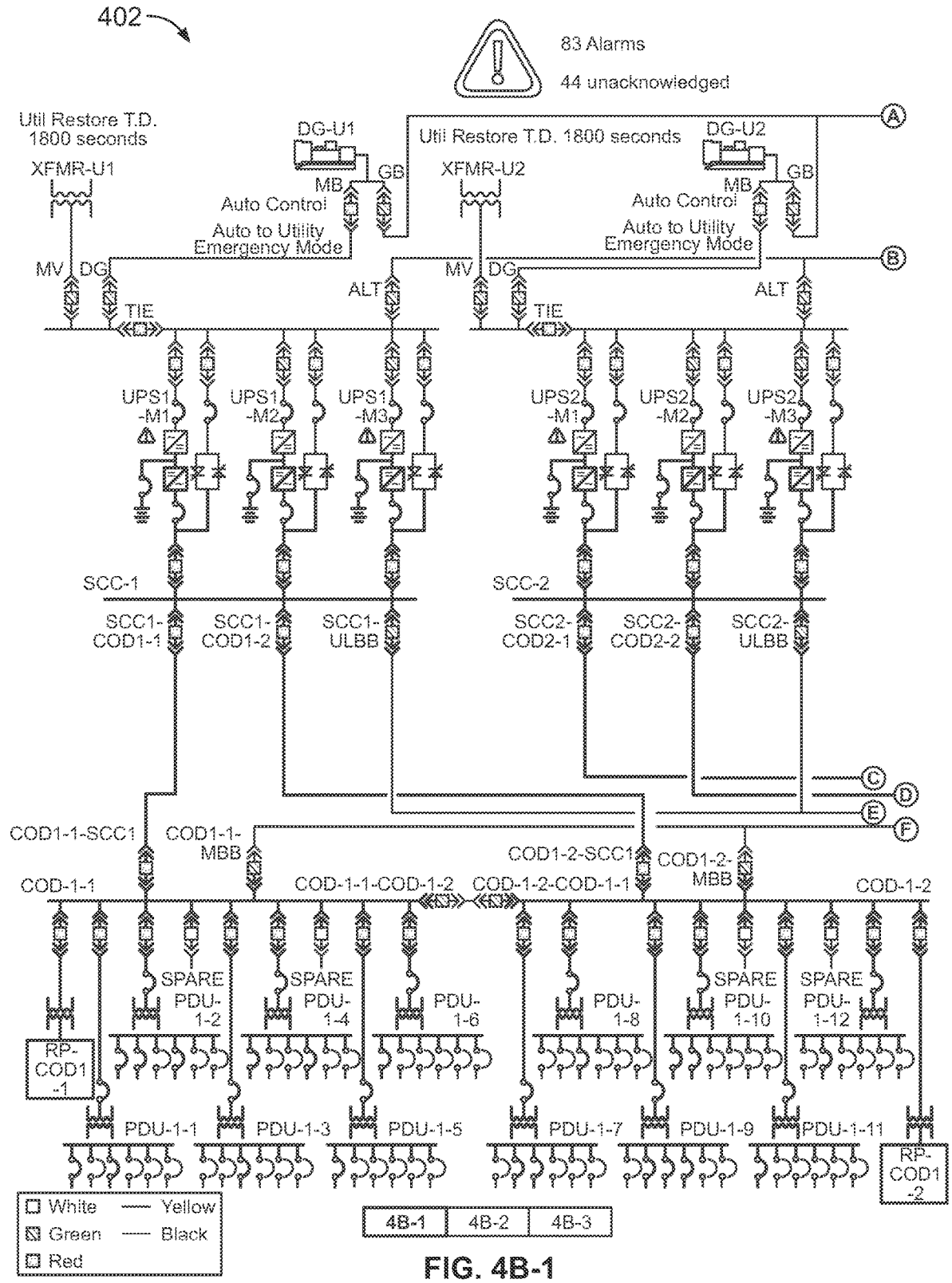
Figures 2, 4B:
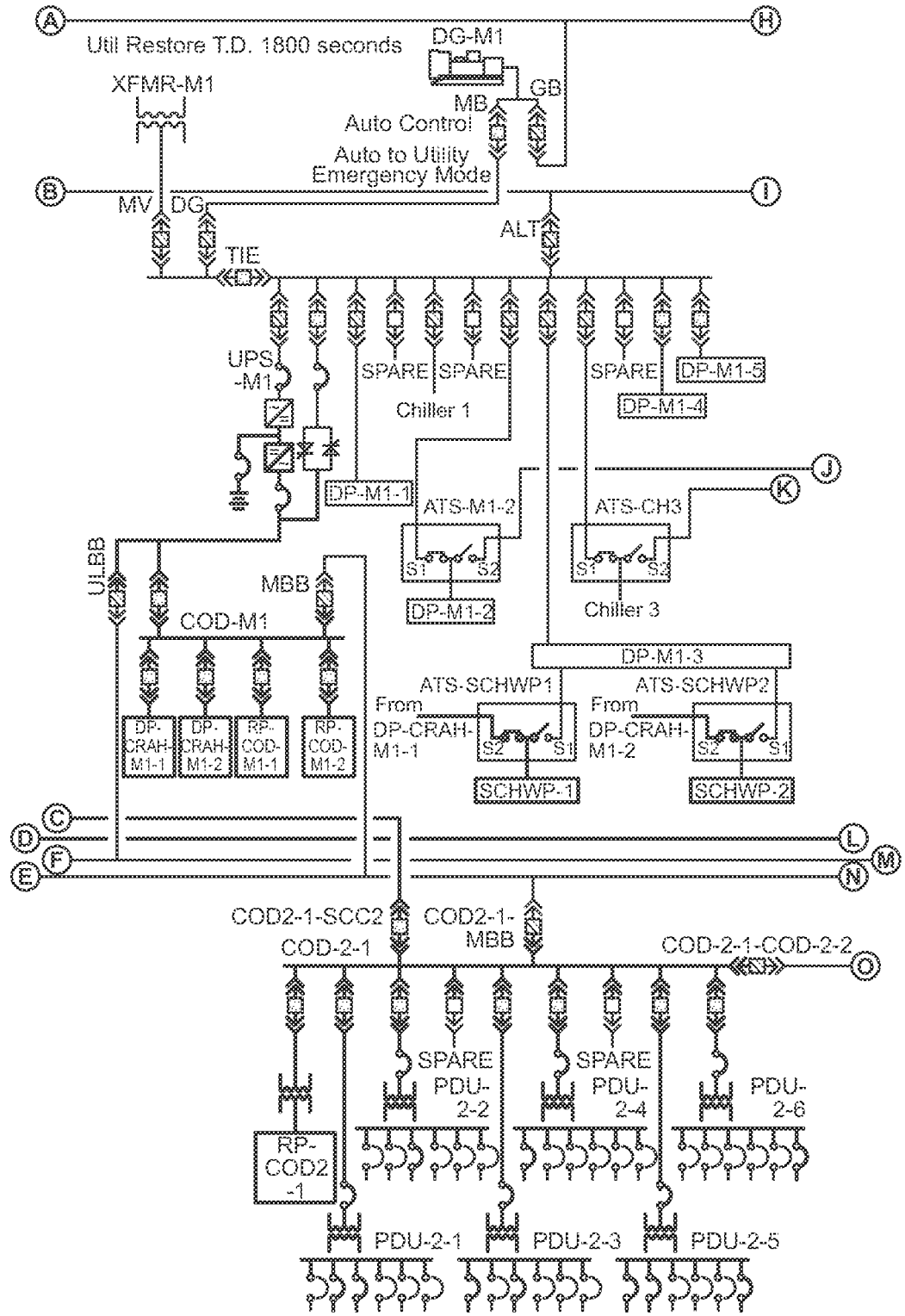
Figures 3, 4B:
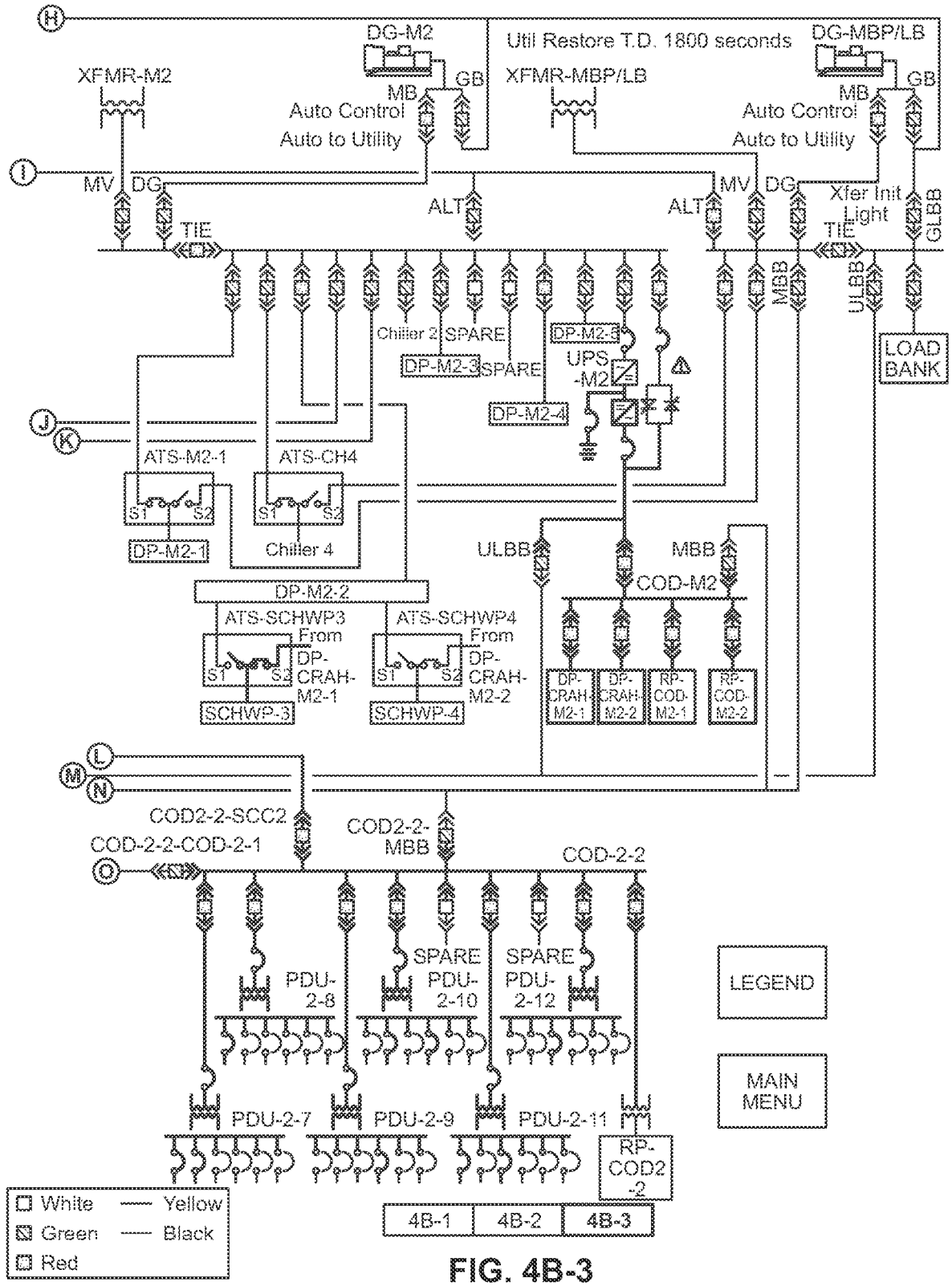
Figures 1, 4C:
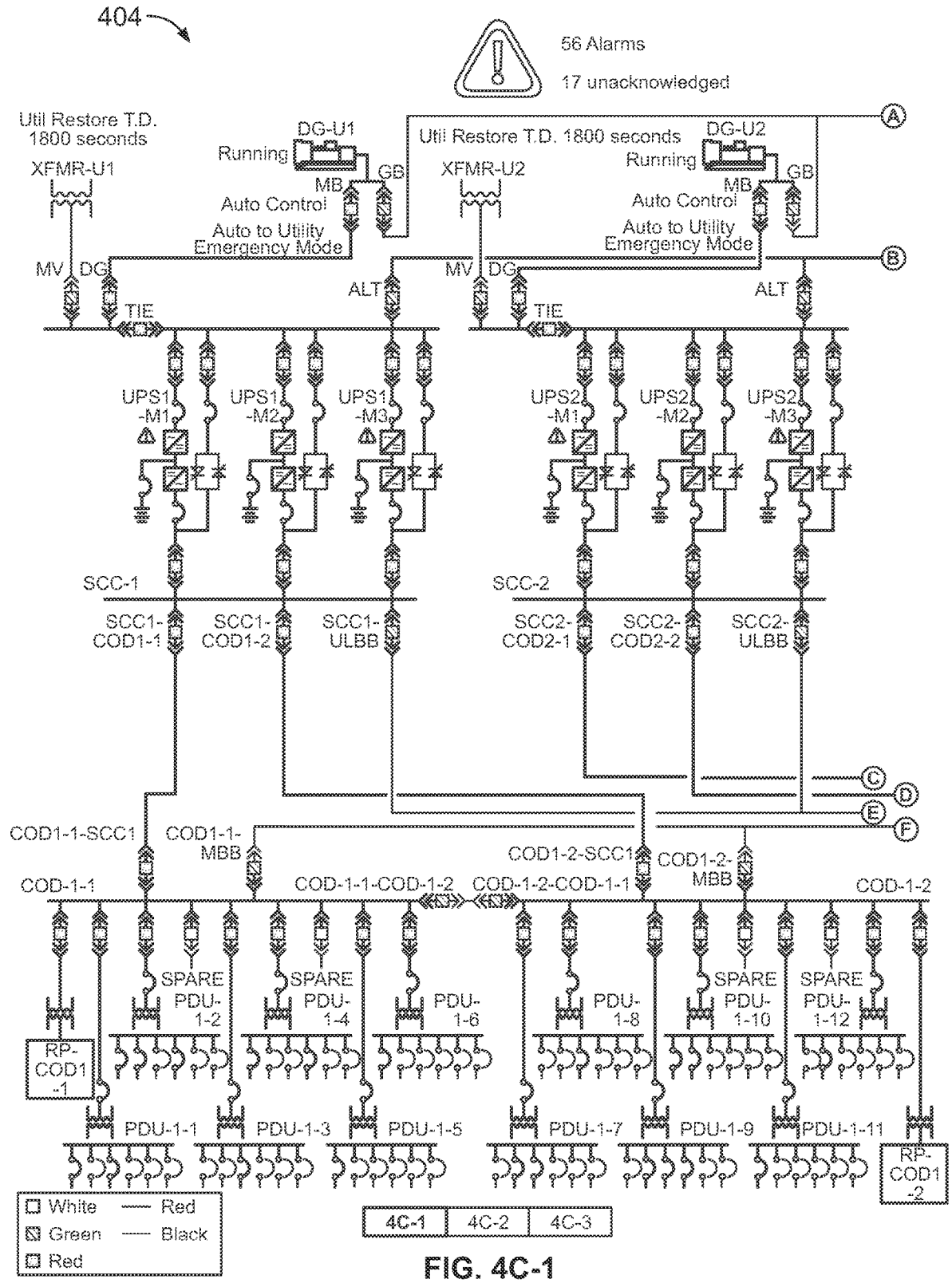
Figures 2, 4C:
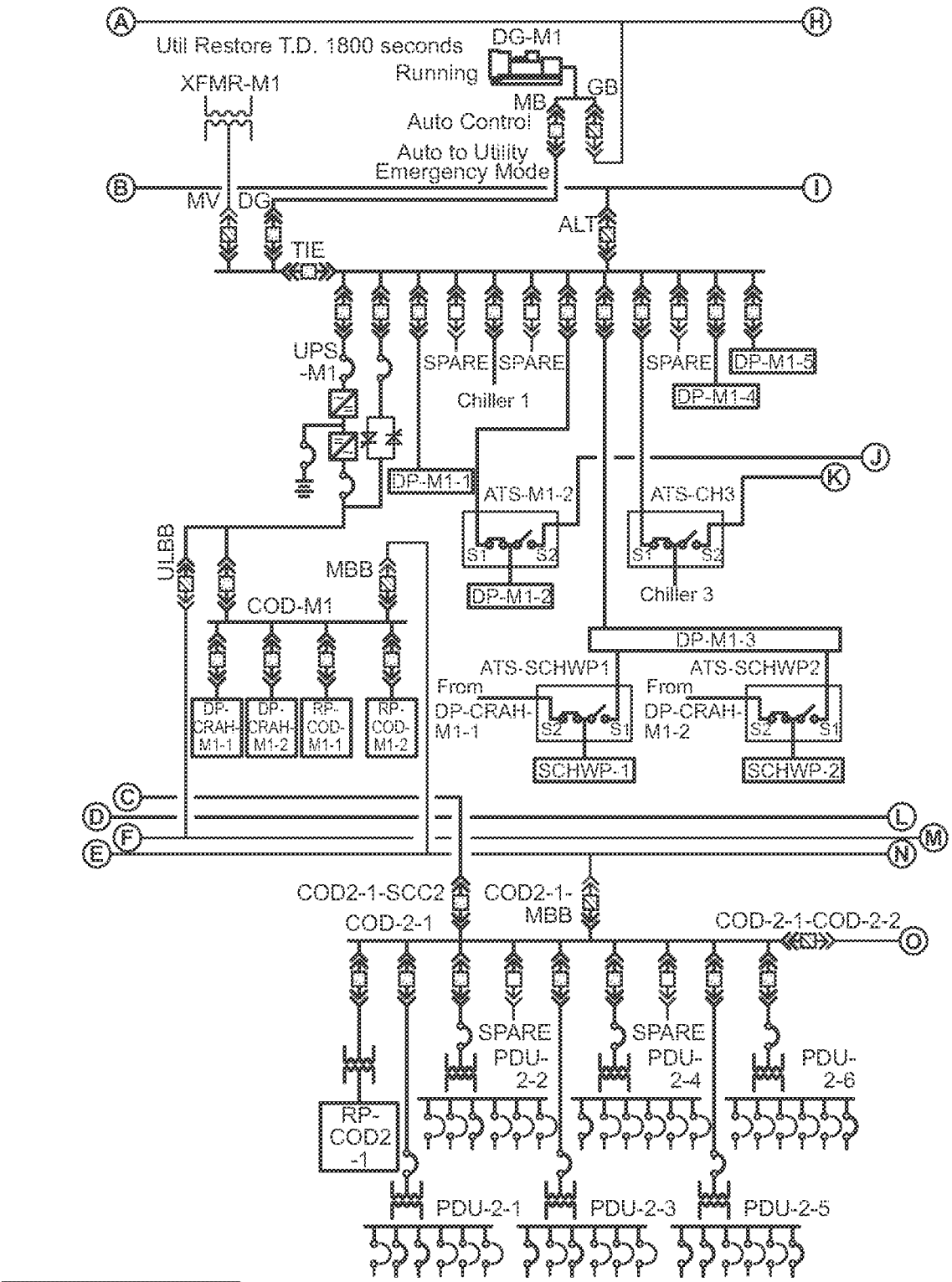
Figures 3, 4C:
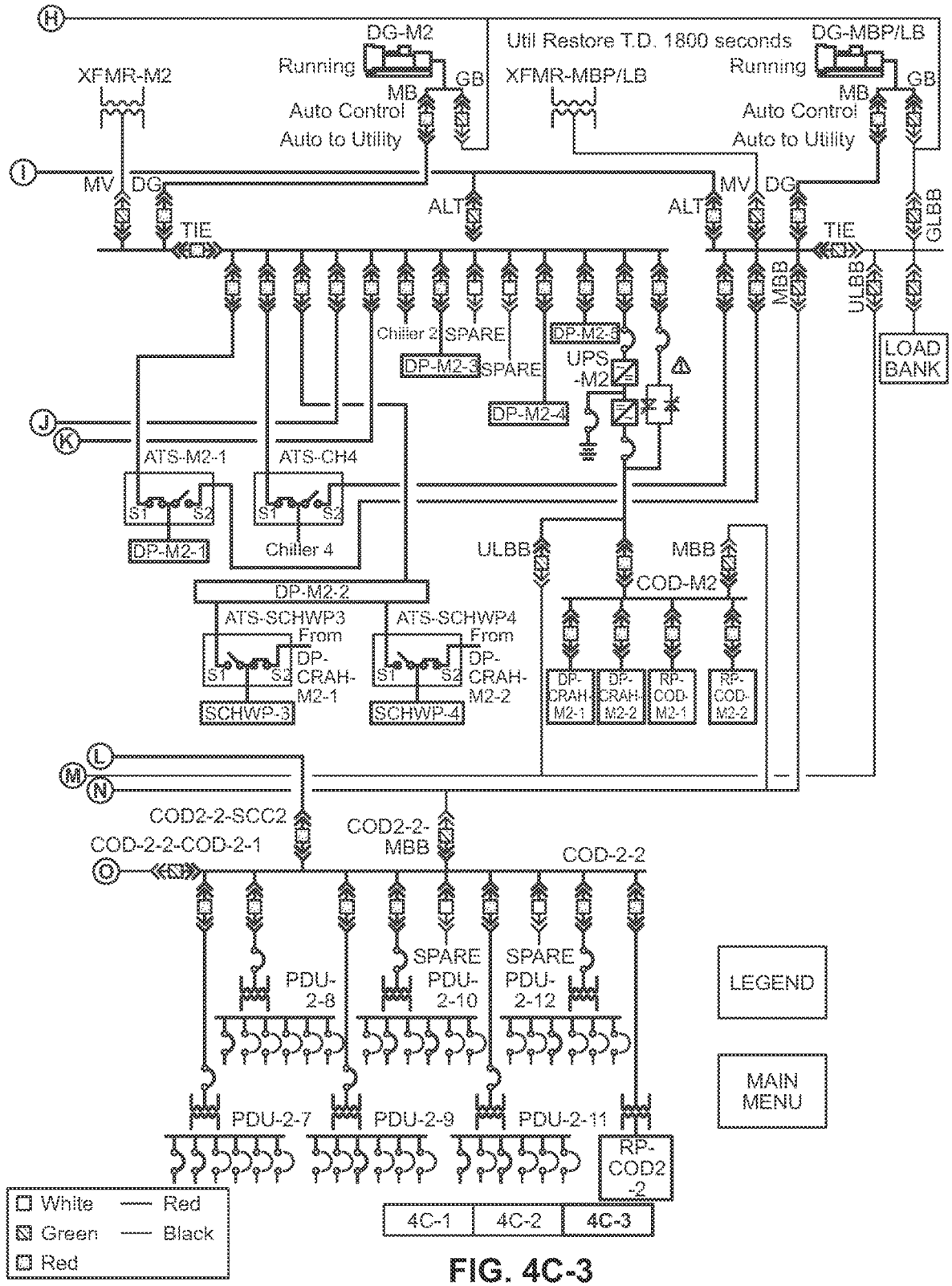

FIGS. 4A-4C depict example screen shots of a display of infrastructure-monitoring control system 102 providing a visual representation of at least one system event. In particular, FIGS. 4A-1, 4A-2, and 4A-3 illustrate screen shot 400, FIGS. 4B-1, 4B-2, and 4B-3 illustrate screen shot 402, and FIGS. 4C-1, 4C-2, and 4C-3 illustrate screen shot 404. In these examples, screen shot 400 depicts a visual representation of system events where the events are "level 1" events (i.e., normal operation). Further, screen shot 402 depicts a visual representation of "level 2" events (i.e., abnormal operation). Still further, screen shot 404 depicts a visual representation of "level 3" events (i.e., emergency operation). It should be understood that while FIGS. 4A-4C depict three example screen shots at various stages during the at least one system event, there would be many more screen shots provided by the infrastructure monitoring system 102 during the event in real-time.

As mentioned above, the infrastructure-monitoring system 102 may display these visual representations in substantially real-time. While there may be slight delay due to the infrastructure-monitoring control system 102 taking appropriate equipment measurements, the infrastructure-monitoring control system 102 preferably provides these visual representations as soon as possible after identifying the system events. In this way, the user of the infrastructure-monitoring system 102 may be viewing the events essentially as the events are occurring in the system 100. Responding to system events may be a highly time-critical matter. Thus, seeing the events unfold in substantially real-time may be important for a user of the infrastructure-monitoring control system 102.

Returning to FIG. 3, at block 304, the infrastructure-monitoring control system 102 may store the visual representation of the at least one system event. The infrastructure-monitoring control system 102 may store the visual representation (e.g., the visual representation of the system events provided by the system 102 for system events related to screen shots 400-406) in data storage 204.

In an example, the infrastructure-monitoring control system 102 may be configured to store all the visual representations provided by the system 102. In this way, a user may be able to review the visual representations at any point during which the infrastructure-monitoring control system 102 was in operation. In an example, the infrastructure-monitoring control system 102 stores all visual representations of the infrastructure-monitoring control system 102, including visual representations provided during normal operation levels of the system equipment.

In other examples, the infrastructure-monitoring control system 102 may be configured to store visual representations in response to detecting a triggering event that prompts the infrastructure-monitoring control system to store the visual representation. Beneficially, only storing the visual representation upon detecting a triggering event may conserve valuable storage space for the infrastructure-monitoring control system 102.

The triggering event may be any appropriate triggering event. In an example, the triggering event may be a system event of a given level. For example, in the example where the system 102 rates events on a scale of 1-3, the infrastructure-monitoring control system 102 may be configured to beginning storing a visual representation when a system event reaches a "level 2" event. Further, in an example, the stored visual representation may cover the time period from the beginning of the "level 2" event until the system returns to "level 1" (i.e., normal operation).

In an example embodiment, the triggering event may user-defined. That is, the triggering event may be an event that is associated with user-defined triggering level. For instance, a user of a first infrastructure-monitoring control system may wish to trigger this storage upon the occurrence of an event of a first level (e.g., a "level 2" event), while another user or a second infrastructure-monitoring control system may wish to trigger this storage only upon the occurrence of an event of a second level (e.g., a "level 3" event).

Returning to FIG. 3, the infrastructure-monitoring control system 102 may then, at block 306, provide the visual representation after a given amount of time since the at least one system event. Generally, the infrastructure-monitoring control system 102 is configured to provide the visual representation after the system 102 has already provided the visual representation in substantially real-time. In a particular example, the given amount of time since the at least one system event is at least one hour after the at least one system event. However, the given amount of time may be any amount of time after the system event or events has occurred. For instance, this given amount of time may be minutes after the event, hours after the event, days after the event, or months after the event. It should be understood that more or less time after the event is possible as well.

A user of the infrastructure-monitoring control system 102 may wish to view the visual representation after the event has occurred in order to analyze the at least one system event. For instance, it may be useful to analyze how the system event or events propagated through the system 100. As another example, it may be useful to analyze the response or measures that were taken in order to contain or fix the system event(s), and to analyze whether those measures were successful or unsuccessful. Other reasons for view the visual representation after the system event(s) are possible as well.

Figure 5:
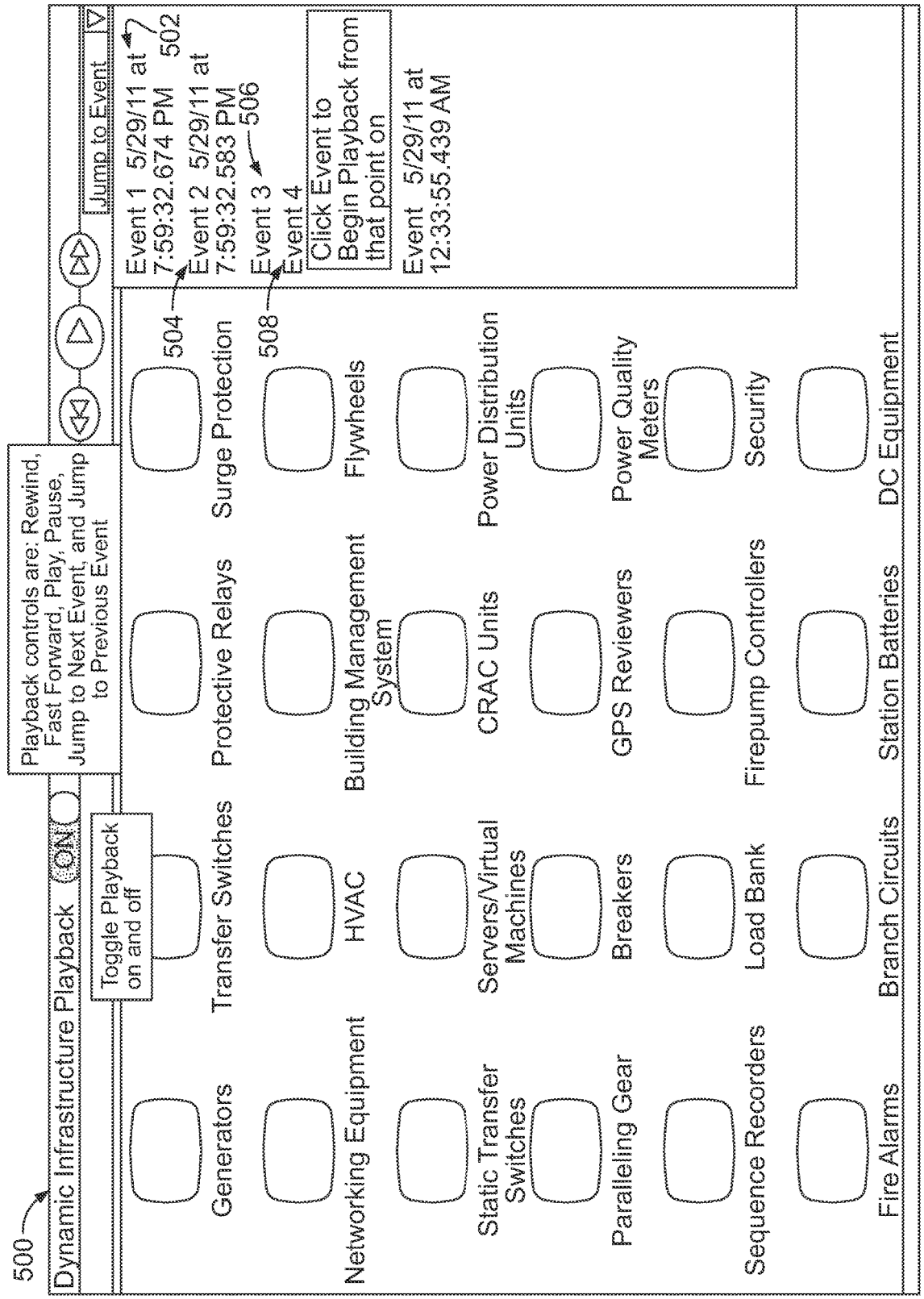
FIG. 5 is an example screen shot of an example display of the infrastructure-monitoring control system, according to an example embodiment of the present disclosure.

FIG. 5 illustrates an example screen shot 500 of a display of infrastructure-monitoring control system 102. Screen shot 500 is an example view of a dynamic infrastructure playback feature of the system 102. A user may interact with such a playback feature via communication interface 206 (which may include, for example, a touch screen, keyboard and/or mouse). In accordance with an example embodiment, a user may select various playback options related to the stored visual representations. Different playback options may include, for example, rewind, fast forward, play, pause, slow motion, jump to next event, and jump to previous event.

In an example, a user may click on an event to view the visual representation of the event a given amount of time since the system event occurred. For instance, a user may click on Event 1 502, Event 2 504, Event 3 506, or Event 4 508. After a user clicks on a given event, the infrastructure-monitory control system 102 may provide the visual representation on display 210. The user may then analyze the visual representation, and the user may utilize the various playback functions as needed. In screen shot 500, the box icons of the various equipment represent dynamic color-coded visual representations of the given equipment. For example, the dynamic visual playback system may include color-coded visual representations of events for various equipment, such as generators, transfer switches, protective relays, surge protection, networking equipment, HVAC, building management, flywheels, static transfer switches, servers/virtual machines, CRAC units, power distribution units, paralleling gear, breakers, GPS receivers, power quality meters, sequence recorders, load banks, firepump controllers, security, fire alarms, branch circuits, station batteries, and DC equipment. Other monitored equipment is possible as well.

In an example embodiment, the system may store the visual representation by storing data that the system 102 may then use to recreate or reproduce the visual representation. For example, the system 102 may store a data file having data representative of the visual representation, and the system 102 may also be configured to use the data file to recreate the visual representation at a later time.

In other example embodiments, the visual representation is not a color-coded visual representation. Rather, the visual representation may be coded in another way in order to visually depict system events occurring in the infrastructure system 100. Any suitable visual representation is possible. For instance, the visual representation may include graphical symbols that illustrate the system events and event levels. For instance, rather than colors such as green, yellow, and red, symbols such as a "+", "−", and "X" could be used to illustrate various levels of system events. Other symbols are possible as well. Further, other codes for visually depicting system events occurring in the infrastructure system 100 are possible as well.

4. Example Benefits of the Disclosed Methods and Systems

As described above, the proposed methods and systems beneficially provide an improved way for analyzing infrastructure system events a given amount of time after the event has occurred. In particular, the proposed methods and systems provide dynamic visual playback for an infrastructure-monitoring control system. Such dynamic visual playback may allow a user to analyze a visual representation of system events after the events have occurred, which is an improvement over merely allowing a user to analyze text-based files of standard infrastructure-monitoring control system event logs. For these reasons and the reasons described throughout the disclosure, the disclosed methods and systems can help improve infrastructure-monitoring control systems and event analysis associated with those systems.

5. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method for providing a visual representation of system events occurring in a system monitored by an infrastructure-monitoring control system, the method comprising:
   depicting, by the infrastructure-monitoring control system a plurality of items of equipment of the system and a plurality of power paths, wherein each respective power path is between a respective item of equipment and one or more of the other items of equipment;
   providing, by the infrastructure-monitoring control system, in substantially real-time, a visual representation of at least one system power-quality event occurring in the system, wherein the visual representation comprises a color-coded visual representation of the plurality of items of equipment and the plurality of power paths that depicts the at least one system power-quality event and propagation of the at least one system power-quality event through the system, wherein propagation of the at least one system power-quality event through the system includes a first system power-quality event occurring in at least one of the plurality of items of equipment of the system, leading to a second system power-quality event occurring in at least another one of the plurality of items of equipment of the system;
   storing, by the infrastructure-monitoring control system, the visual representation in response to the infrastructure-monitoring control system detecting the at least one system power-quality event being of a given level that prompts the infrastructure-monitoring control system to begin storing the visual representation until the system returns to normal operation; and
   providing, by the infrastructure-monitoring control system, playback of the same visual representation after a given amount of time since the at least one system event.

2. The method of claim 1, wherein the infrastructure-monitoring control system rates system events on a scale having a plurality of event levels, and wherein the infrastructure-monitoring control system associates each event level with a given color, the method further comprising:
   the infrastructure-monitoring control system determining, for each of the at least one system power-quality event, an event level of the system event, and
   wherein providing the visual representation of the at least one system power-quality event comprises, for each of the at least one system event, depicting the system event with the given color associated with the determined event level of the system event.

3. The method of claim 1, wherein the infrastructure-monitoring control system provides the visual representation on a monitor of the infrastructure-monitoring control system.

4. The method of claim 1, wherein the at least one system power-quality event comprises a power-quality problem.

5. The method of claim 4, wherein the power-quality problem is a power problem manifested in at least one of voltage, current, or frequency deviations that results in at least one of reduction in expected life, disoperation, or failure of system equipment.

6. The method of claim 1, wherein the infrastructure-monitoring control system storing the visual representation occurs in response to the infrastructure-monitoring control system detecting a triggering event that prompts the infrastructure-monitoring control system to store the visual representation.

7. The method of claim 6, wherein the triggering event is an event that is associated with user-defined triggering level.

8. The method of claim 1, wherein the infrastructure-monitoring control system monitors equipment selected from the group consisting of: generators, breakers, transfer switches, fire pump controllers, load banks, programmable logic controllers (PLCs), uninterruptible power supplies (UPSs), and power quality meters.

9. The method of claim 1, wherein the given amount of time since the at least one system power-quality event is at least an hour after the at least one system power-quality event.

10. A method for providing a visual representation of system events occurring in a system monitored by an infrastructure-monitoring control system, the method comprising:
   providing, by the infrastructure-monitoring control system, in substantially real-time, a visual representation of at least one system power-quality event occurring in the system, wherein the visual representation depicts a plurality of items of equipment and a plurality of power paths, wherein each respective power path is between a respective item of equipment and one or more of the other items of equipment, and wherein the visual representation further depicts the at least one system power-quality event and propagation of the at least one system power-quality event through one or more of the items of equipment and one or more of the power paths, wherein propagation of the at least one system power-quality event through the system includes a first system power-quality event occurring in at least one of the plurality of items of equipment of the system leading to a second system power-quality event occurring in at least another one of the plurality of items of equipment of the system;
   storing, by the infrastructure-monitoring control system, the visual representation in response to the infrastructure-monitoring control system detecting the at least one system power-quality event being of a given level that prompts the infrastructure-monitoring control system to begin storing the visual representation until the system returns to normal operation; and providing, by the infrastructure-monitoring control system, playback of the same visual representation after a given amount of time since the at least one system event.

11. The method of claim 10, wherein the infrastructure-monitoring control system provides the visual representation on a monitor of the infrastructure-monitoring control system.

12. The method of claim 10, wherein the at least one system power-quality event comprises a power-quality problem.

13. The method of claim 12, wherein the power-quality problem is a power problem manifested in voltage, current, or frequency deviations that results in reduction in expected life, disoperation, or failure of system equipment.

14. The method of claim 10, wherein the infrastructure-monitoring control system storing the visual representation occurs in response to the infrastructure-monitoring control system detecting a triggering event that prompts the infrastructure-monitoring control system to store the visual representation.

15. The method of claim 14, wherein the triggering event is an event that is associated with user-defined triggering level.

16. The method of claim 10, wherein the infrastructure-monitoring control system monitors equipment selected from the group consisting of: generators, breakers, transfer switches, fire pump controllers, load banks, programmable logic controllers (PLCs), uninterruptible power supplies (UPSs), and power quality meters.

17. The method of claim 10, wherein the given amount of time since the at least one system power-quality event is at least a minute after the at least one system power-quality event.

18. An infrastructure-monitoring control system comprising:
- a communication interface;
- a memory configured to store program instructions; and
- a processor capable of executing the program instructions to:
  (i) provide, in substantially real-time, a visual representation of at least one system power-quality event occurring in the system, wherein the visual representation depicts a plurality of items of equipment and a plurality of power paths, wherein each respective power path is between a respective item of equipment and one or more of the other items of equipment, and wherein the visual representation further depicts the at least one system power-quality event and propagation of the at least one system power-quality event through one or more of the items of equipment and one or more of the power paths, wherein propagation of the at last one system power-quality event through the system includes a first system power-quality event occurring in at least one of the plurality of items of equipment of the system leading to a second system power-quality event occurring in at least another one of the plurality of items of equipment of the system;
  (ii) store the visual representation in response to the infrastructure-monitoring control system detecting the at least one system power-quality event being of a given level that prompts the infrastructure-monitoring control system to begin storing the visual representation until the system returns to normal operation; and
  (iii) provide playback of the same visual representation after a given amount of time since the at least one system event.

19. The infrastructure-monitoring control system of claim 18, wherein the communication interface comprises a monitor for displaying the visual representation.

20. The infrastructure-monitoring control system of claim 18, wherein the infrastructure-monitoring control system monitors equipment selected from the group consisting of: generators, breakers, transfer switches, fire pump controllers, load banks, programmable logic controllers (PLCs), uninterruptible power supplies (UPSs), and power quality meters.

* * * * *